United States Patent
Capoglu et al.

(10) Patent No.: US 11,150,374 B2
(45) Date of Patent: Oct. 19, 2021

(54) MAPPING PIPE BENDS IN A WELL CASING

(71) Applicant: Halliburton Energy Services, Inc., Houston, TX (US)

(72) Inventors: Ilker R. Capoglu, Houston, TX (US); Ahmed Elsayed Fouda, Spring, TX (US); Freeman Lee Hill, III, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 261 days.

(21) Appl. No.: 16/453,673

(22) Filed: Jun. 26, 2019

(65) Prior Publication Data
US 2020/0081148 A1  Mar. 12, 2020

Related U.S. Application Data

(60) Provisional application No. 62/729,222, filed on Sep. 10, 2018.

(51) Int. Cl.
*G01V 3/28* (2006.01)
*E21B 47/024* (2006.01)
*E21B 47/00* (2012.01)

(52) U.S. Cl.
CPC ............... *G01V 3/28* (2013.01); *E21B 47/00* (2013.01); *E21B 47/024* (2013.01)

(58) Field of Classification Search
CPC .......... G01V 3/28; E21B 47/00; E21B 47/024
(Continued)

(56) References Cited

U.S. PATENT DOCUMENTS

| 4,808,925 A | 2/1989 | Baird |
| 5,453,688 A * | 9/1995 | Cecco ................... G01B 7/281 |
| | | 324/220 |

(Continued)

FOREIGN PATENT DOCUMENTS

| WO | 2014189497 | 11/2014 |
| WO | 2017011078 | 1/2017 |

(Continued)

OTHER PUBLICATIONS

Written Opinion of the International Searching Authority—PCT/US2019/039320 (Year: 2020).*

(Continued)

*Primary Examiner* — Reena Aurora
*Assistant Examiner* — Sean Curtis
(74) *Attorney, Agent, or Firm* — John Wustenberg; C. Tumey Law Group PLLC

(57) ABSTRACT

A method and system for identifying a deformation. The method may comprise disposing an electromagnetic logging tool in a pipe string, performing a logging operation with the electromagnetic logging tool, transmitting an electromagnetic field from a transmitter, energizing the casing string with the electromagnetic field to produce an eddy current, measuring the eddy current with at least one receiver, processing the measurements of the eddy current to find a point-wise eccentricity between the casing string and the pipe string, identifying a zone with the deformation based at least in part on the point-wise eccentricity, determining at least one characteristic of the deformation, and making a wellbore decision related to an integrity of the casing string based on the at least one characteristic of the deformation or the point-wise eccentricity. The system may comprise an electromagnetic logging tool which may comprise a transmitter and at least one receiver.

20 Claims, 3 Drawing Sheets

TRUE PIPE CONFIGURATION

(58) Field of Classification Search
USPC .................................. 324/339, 366, 368, 303
See application file for complete search history.

(56) References Cited

U.S. PATENT DOCUMENTS

| | | | |
|---|---|---|---|
| 7,095,232 B2 | 8/2006 | Haber et al. | |
| 7,273,097 B2* | 9/2007 | Fox | E21B 47/00 166/250.02 |
| 8,049,507 B2* | 11/2011 | Rabinovich | G01V 3/28 324/338 |
| 8,547,428 B1 | 10/2013 | Olsson et al. | |
| 9,089,928 B2* | 7/2015 | Zediker | B23K 26/0096 |
| 9,492,885 B2* | 11/2016 | Zediker | B23K 26/064 |
| 9,512,712 B2* | 12/2016 | Donderici | E21B 47/007 |
| 9,664,012 B2* | 5/2017 | Deutch | E21B 33/13 |
| 9,669,492 B2* | 6/2017 | Linyaev | B23K 26/38 |
| 9,803,466 B2* | 10/2017 | Donderici | E21B 47/007 |
| 10,082,017 B2* | 9/2018 | Yu | E21B 47/12 |
| 10,190,404 B2* | 1/2019 | Khalaj Amineh | E21B 47/085 |
| 10,655,452 B2* | 5/2020 | Khalaj Amineh | G01V 3/38 |
| 10,711,580 B2* | 7/2020 | Deutch | E21B 33/13 |
| 10,725,194 B2* | 7/2020 | Fouda | E21B 47/092 |
| 10,823,873 B2* | 11/2020 | Fouda | E21B 47/00 |
| 10,884,158 B2* | 1/2021 | Kasten | G01V 3/30 |
| 10,895,147 B2* | 1/2021 | Ren | G01B 7/10 |
| 10,901,111 B2* | 1/2021 | Donderici | E21B 47/092 |
| 10,953,491 B2* | 3/2021 | Zediker | B23K 26/0096 |
| 10,989,045 B2* | 4/2021 | Fouda | E21B 47/085 |
| 10,996,199 B2* | 5/2021 | Fouda | G01N 27/9046 |
| 2004/0256101 A1* | 12/2004 | Fox | E21B 47/007 166/252.5 |
| 2009/0195244 A1 | 8/2009 | Mouget et al. | |
| 2010/0109672 A1* | 5/2010 | Rabinovich | G01V 3/28 324/338 |
| 2013/0319984 A1* | 12/2013 | Linyaev | B23K 26/38 219/121.72 |
| 2014/0090846 A1* | 4/2014 | Deutch | E21B 33/13 166/297 |
| 2014/0231085 A1* | 8/2014 | Zediker | B63B 35/28 166/288 |
| 2015/0285607 A1 | 10/2015 | Helmore | |
| 2015/0321290 A1* | 11/2015 | Zediker | B23K 26/106 219/121.67 |
| 2016/0160629 A1* | 6/2016 | Donderici | G01N 27/9046 324/238 |
| 2016/0168974 A1* | 6/2016 | Donderici | E21B 47/085 324/238 |
| 2017/0081955 A1* | 3/2017 | Yu | G01V 3/28 |
| 2017/0191361 A1* | 7/2017 | Khalaj Amineh | E21B 47/13 |
| 2017/0252858 A1* | 9/2017 | Zediker | E02B 17/027 |
| 2017/0266760 A1* | 9/2017 | Linyaev | B23K 26/106 |
| 2017/0362925 A1 | 12/2017 | Zhang | |
| 2018/0045024 A1* | 2/2018 | Deutch | E21B 29/00 |
| 2019/0049618 A1* | 2/2019 | Kasten | G01V 5/145 |
| 2019/0145247 A1* | 5/2019 | Khalaj Amineh | G01V 3/38 324/339 |
| 2019/0330926 A1* | 10/2019 | Clausen | E21B 7/068 |
| 2019/0369285 A1* | 12/2019 | Fouda | E21B 47/00 |
| 2020/0011169 A1* | 1/2020 | Haghshenas | G01B 5/20 |
| 2020/0081148 A1* | 3/2020 | Capoglu | E21B 47/00 |
| 2020/0182830 A1* | 6/2020 | Fouda | E21B 47/092 |
| 2020/0190969 A1* | 6/2020 | Ren | G01B 7/10 |
| 2020/0200940 A1* | 6/2020 | Fouda | E21B 47/00 |
| 2020/0271818 A1* | 8/2020 | Fouda | E21B 47/085 |
| 2020/0271819 A1* | 8/2020 | Khalaj Amineh | E21B 47/00 |
| 2020/0309986 A1* | 10/2020 | Donderici | G01V 3/38 |
| 2020/0333500 A1* | 10/2020 | Fouda | G01V 3/38 |
| 2020/0378240 A1* | 12/2020 | Fouda | G05B 13/04 |
| 2021/0054731 A1* | 2/2021 | Fouda | E21B 47/085 |
| 2021/0231613 A1* | 7/2021 | Kumakura | H03F 3/211 |
| 2021/0239874 A1* | 8/2021 | Fouda | G01B 7/10 |

FOREIGN PATENT DOCUMENTS

| | | | | |
|---|---|---|---|---|
| WO | WO-2017011078 A1 * | 1/2017 | | G01V 3/28 |
| WO | 2017151117 | 9/2017 | | |
| WO | WO-2017151117 A1 * | 9/2017 | | G01V 3/30 |
| WO | 2018009221 | 1/2018 | | |
| WO | WO-2018009221 A1 * | 1/2018 | | E21B 49/00 |
| WO | WO-2020055493 A1 * | 3/2020 | | E21B 47/00 |

OTHER PUBLICATIONS

J. Garcia et al., "Successful application of a new electromagnetic corrosion tool for well integrity evaluation in old wells completed with reduced diameter tubular," IPTC 16997.
A. A. Arbuzov et al., "Memory magnetic imaging defectoscopy," SPE 162054.
Schlumberger, EM Pipe Scanner, Electromagnetic Casing Inspection Tool, Brochure, 2009.
Gowell, Magnetic Thickness Detector (MTD), Nov. 2018.
Halliburton, Electromagnetic Pipe Xaminer@ V (EPX V) Tool, Well Assurance, H012406, May 2019.
Multi Tube Integrity, 2019, available at https://tgtdiagnostics.com/product/multi-tube-integrity/.
International Search Report and Written Opinion for PCT/US2019/039320 dated Oct. 18, 2019.

* cited by examiner

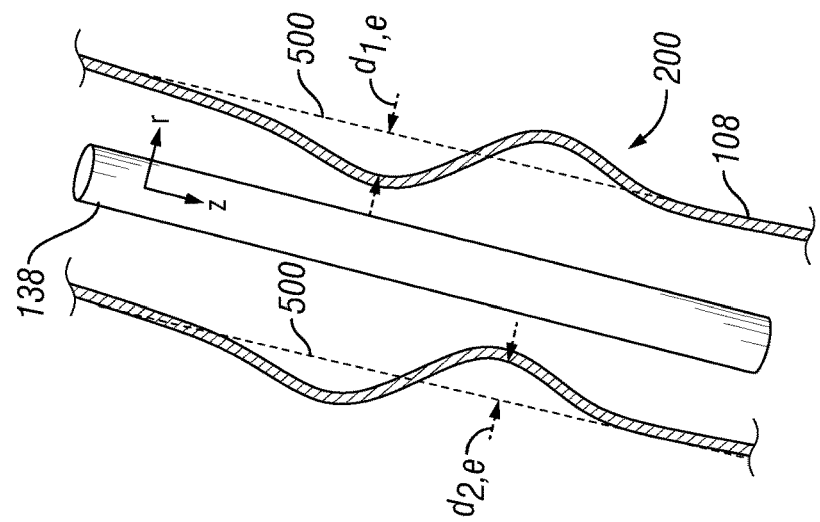
FIG. 5
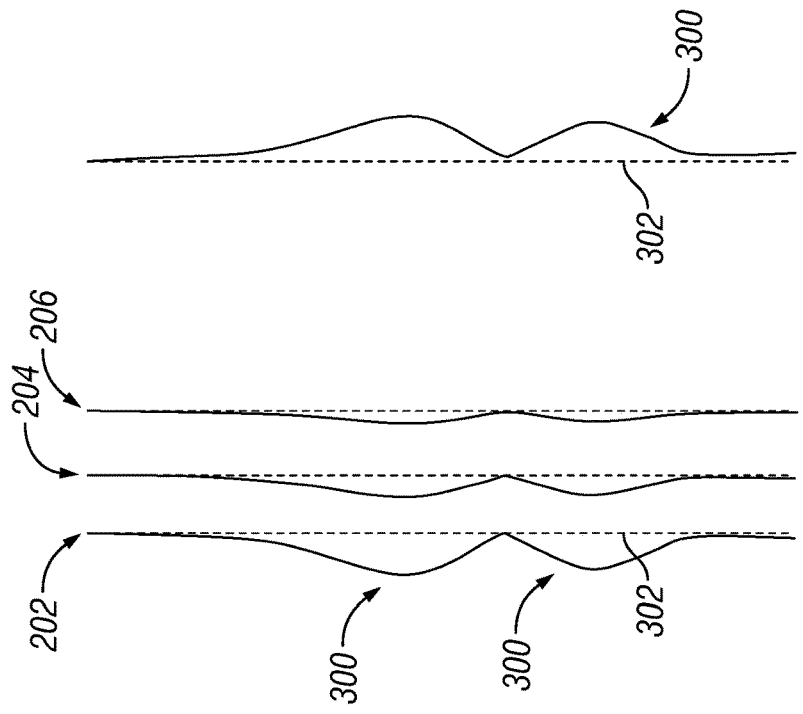
FIG. 4
FIG. 3
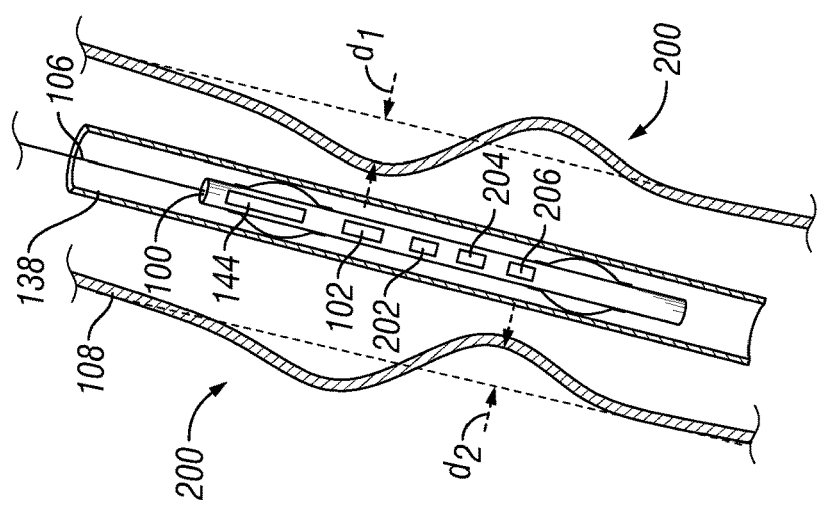
FIG. 2

MAPPING PIPE BENDS IN A WELL CASING

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Electromagnetic (EM) techniques are commonly used to monitor the condition of the production and intermediate casing strings, tubing, collars, filters, packers and perforations. One common EM technique may be the eddy current (EC) technique. In EC, when the transmitter coil emits the primary transient EM fields, eddy currents are induced in the casing. These eddy currents then produce secondary fields which are received along with the primary fields by the receiver coil. The acquired data may be employed to perform evaluation of the multiple pipes.

During evaluation of downhole pipes, an operator may look for deformations in a pipe. A common form of pipe deformation is bends that may occur in any of the multiple nested pipes. Bends put pipes under increased stress and make them more liable to corrosion. EM techniques may be sensitive to bends beyond the innermost pipes and may therefore be used to estimate the severity of the bends. In examples, EM techniques may be able to determine the shape of the bend, the magnitude/severity of the bend, and the axial extent of the bend. Such information may be valuable in assessing the integrity of a well tubular.

BRIEF DESCRIPTION OF THE DRAWINGS

These drawings illustrate certain aspects of some examples of the present disclosure, and should not be used to limit or define the disclosure.

FIG. 2 illustrates an example of deformation in a tubular;

FIG. 3 illustrates an example of a deformation measurement in a tubular in a wellbore;

FIG. 4 illustrates an example of the deformation measurement being processed by point-wise eccentricity;

FIG. 5 illustrates an example of a pipe trajectory map; and

DETAILED DESCRIPTION

This disclosure may generally relate to methods for identifying deformations in a tubular with an electromagnetic logging tool in an eccentric pipe configuration comprising a plurality of pipes. Electromagnetic (EM) sensing may provide continuous in situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more). EM logging tools may measure eddy currents to determine metal loss and use magnetic cores at the transmitters. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. The EM logging tools may operate on a conveyance. EM logging tools may include an independent power supply and may store the acquired data on memory. A magnetic core may be used in defect detection in multiple concentric pipes.

Monitoring the condition of the production and intermediate casing strings is crucial in oil and gas field operations. EM eddy current (EC) techniques have been successfully used in inspection of these components. EM EC techniques consist of two broad categories: frequency-domain EC techniques and time-domain EC techniques. In both techniques, one or more transmitters are excited with an excitation signal, and the signals from the pipes are received and recorded for interpretation. The received signal is typically proportional to the amount of metal that is around the transmitter and the receiver. For example, less signal magnitude is typically an indication of more metal, and more signal magnitude is an indication of less metal. This relationship may allow for an operator to produce a pipe trajectory map of deformations in pipe, such as bends and/or sagging.

Figure 1:
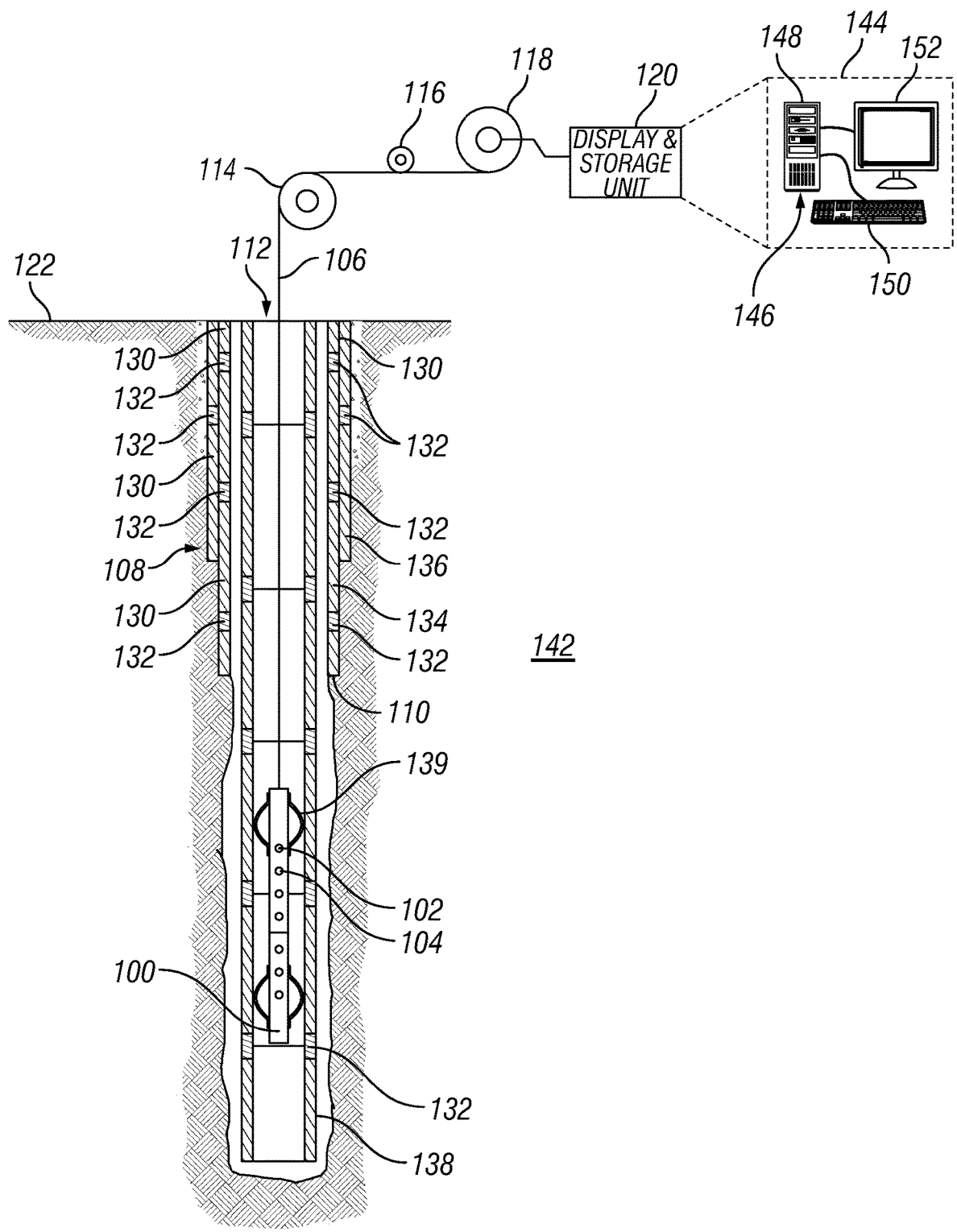
FIG. 1 illustrates an example of an EM logging tool disposed in a wellbore.

FIG. 1 illustrates an operating environment for an EM logging tool 100 as disclosed herein. EM logging tool 100 may comprise a transmitter 102 and/or a receiver 104. In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110. Additionally, EM logging tool 100 may comprise stabilizers 139. Stabilizers 139 may operate and function to position EM logging tool 100 in the center of pipe string 138. Without limitation, stabilizers 139 may be leaf spring and/or any other suitable mechanical device to position EM logging tool 100 in the center of pipe string 138.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

EM logging tool 100 may be used for excitation of transmitter 102. Transmitter 102 may broadcast electromagnetic fields into subterranean formation 142. Transmitter 102 may be any suitable device including, but not limited to, a wire antenna, a toroidal antenna, a solenoid, and/or button electrodes. It should be noted that broadcasting electromagnetic fields may also be referred to as transmitting electromagnetic fields. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. Receivers 104 may be any suitable device including, but not limited to, wire antennas, toroidal antennas, solenoids, and/or button electrodes. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by the transmitter 102 and the sensing and/or measuring of secondary electromagnetic fields by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on the EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. The remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\,t \qquad (1)$$

and the magnitude of the impedance shows the dependence:

$$\exp[-2(\sqrt{\omega\mu\sigma/2})t] \qquad (2)$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \simeq 2\frac{t}{\delta} \qquad (4)$$

and the magnitude of the impedance shows the dependence:

$$\exp[-2t/\delta] \qquad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Electromagnetic techniques in the time domain and/or frequency domain may also be used to identify bends and/or sagging in pipe string 138 and/or casing string 108. It should be noted that bends and/or sagging may be defined as any alteration of the geometry in pipe string 138 and/or casing string 108. In examples, identifying bends and/or sagging may be performed using EM logging tool 100, which may normally be utilized to determine corrosion within pipe string 138 and/or casing string 108

FIG. 2 illustrates EM logging tool 100 disposed inside pipe string 138 and pipe string 138 may be disposed in casing string 108. As illustrated, casing string 108 may comprise a deformation 200. It should be noted that deformation 200 may be defined as a bend and/or sagging in casing string 108 or pipe string 138. As illustrated, deformation 200 may have amplitudes of $d_1$ and $d_2$. EM logging tool 100 may be lowered into pipe string 138 by conveyance 106 and may be centered in pipe string 138 by stabilizer 149. Centralizing EM logging tool 100 may also centralize transmitter 102, first receiver 202, second receiver 204, and/or third receiver 206. Centralizing transmitter 102, first receiver 202, second receiver 204, and/or third receiver 206 in pipe string 138 may allow for an accurate detection of deformations 200. Controlling transmitter 102, first receiver 202, second receiver 204, and/or third receiver 206 may be performed by information handling system 144. It should be noted that information handling system 144 may be disposed on EM logging tool 100 and at the surface 122. In examples, information handling system 144 may be disposed on EM logging tool 100 or the surface 122. Control signals may be transmitted from information handling system 144 to transmitter 102, first receiver 202, second receiver 204, and/or third receiver 206. Additionally, measurements and/or data may be transmitted from transmitter 102, first receiver 202, second receiver 204, and/or third receiver 206 to information handling system 144. Without limitation, information handling system 144 may comprise a navigation device (e.g., gyroscope, magnetometer, accelerometer, etc.). The navigation device may measure the inclination of EM logging tool 100 relative to the gravity direction which may match the trajectory of pipe string 138.

During logging operations, wellbore 110 (e.g., referring to FIG. 1) may be logged with EM logging tool 100. In examples, EM logging tool 100 may be activated and logging going down and/or up pipe string 138. For example, during logging operations first receiver 202, second receiver 204, and/or third receiver 206 may measure eddy currents. As illustrated in FIG. 3, first receiver 202, second receiver 204, and/or third receiver 206 may capture and record the eddy current measurements illustrated. Deformations 200 in casing string 108 and/or pipe string 138 (e.g., referring to FIG. 2) may be illustrated as a deflection 300. Deflection 300 is defined as a measured response that may not conform to baseline 302. In examples, deflection 300 may be more prominently pronounced in the short-spacing receivers (e.g., first receiver 202 and/or second receiver 204) than in long-spacing receiver (e.g., third receiver 206). Measurement from first receiver 202, second receiver 204, and/or third receiver 206 may be further processed by information handling system 144 (e.g., referring to FIG. 1).

During processing operations, specifically a joint processing of multi-spacing measurements, the point-wise eccentricity between the pipes may be estimated as shown in FIG. 4. The point-wise eccentricity may further illustrate deflection 300 from baseline 302 and the amplitude associated with deformations 200 (e.g., referring to FIG. 2) that may be associated with casing string 108 and/or pipe string 138. The information and/or data from the point-wise eccentricity processing may be utilized to create a pipe trajectory map.

A pipe trajectory map, as illustrated in FIG. 5, may illustrate deformation 200 amplitudes $d_{2,e}$ and $d_{1,e}$ of casing string 108 in relation to pipe string 138. In examples, deformations 200 may also be illustrated for pipe string 138. It should be noted that azimuthally symmetric coils are used transmitter 102, first receiver 202, second receiver 204, and/or third receiver 206 for FIGS. 1-5. Therefore, both deformations 200 may be illustrated by the pipe trajectory map in the same direction. On constructing the pipe trajectory, it is noted that both end sections of the shown piece of log coincide with baseline 500, which may indicate that the two identified bends must be on opposite direction from baseline 500. The absolute direction of each bend and the plane of the bends may not be determined by an EM logging tool 100 (e.g., referring to FIG. 2) that may be azimuthally symmetric. Thus, the constructed trajectory map of FIG. 5 is a 2-dimensional relative map.

In examples, EM logging tool 100 (e.g., referring to FIG. 1) may be equipped with azimuthal sensors that may also solve for the eccentricity angle among other pipe parameters. Azimuthal sensors may comprise extendable arms with sensors, titled coils, tri-axial coils, or combinations thereof. Using the eccentricity angle information in combination with EM logging tool 100 trajectory information from the navigation data, 3-dimensional pipe trajectories may constructed. In this case, the process of pattern matching to estimate bend properties may be preceded by a tensor rotation to align the measurement to the reference bend azimuth in the database.

Figure 6:
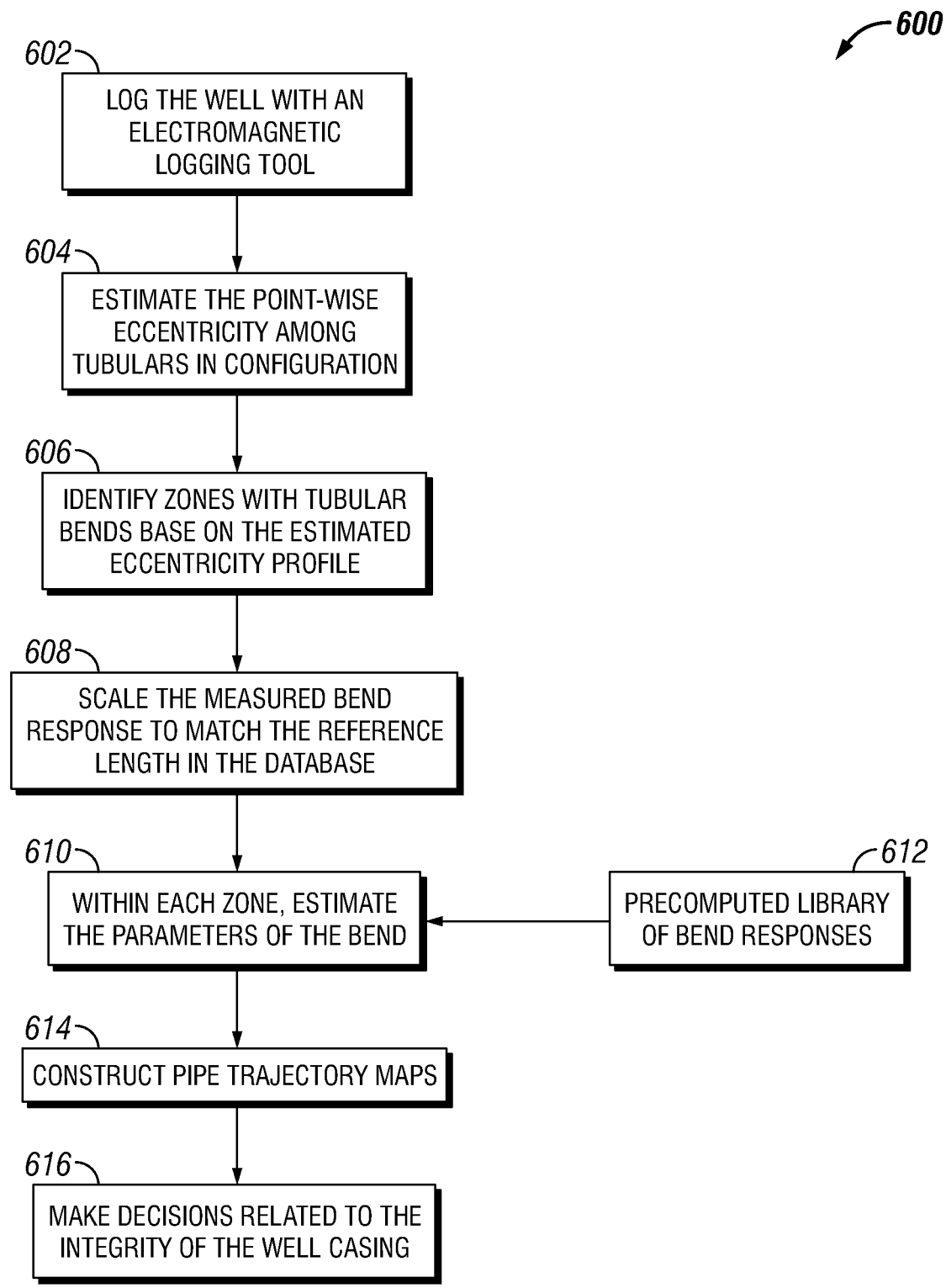
FIG. 6 illustrates a workflow for producing a pipe trajectory map.

FIG. 6 illustrates workflow 600 for pipe trajectory mapping. In examples workflow 600 may begin with step 602. Step 602 may comprise logging the well with EM logging tool 100. As discussed above, EM logging tool 100 may be disposed into wellbore 110 by a conveyance 106 (e.g., referring to FIG. 1). During logging operations, EM logging tool 100 may be disposed in a tubular. It should be noted a tubular may include a pipe string 138, which may be disposed in another tubular such as casing string 108. EM logging tool 100 may make measurements as conveyance 106 moves EM logging tool 100 down a tubular. Additionally, EM logging tool 100 may make measurements as EM logging tool 100 is moved up the tubular by conveyance 106. Measurement taken during logging operations may be further processed to form a pipe trajectory map.

Measurements from step 602 may processed in step 604. Step 604 may comprise estimating estimate the point-wise eccentricity among tubulars in configuration at each logging point. For example, processing operations may involve model-based point-wise inversion to solve for one or more of the following: the individual thickness of each pipe, percentage metal loss or gain of each pipe, the individual magnetic permeability of each pipe, the individual electrical conductivity of each pipe, the total thickness of all pipes, the eccentricity of each pipe, and/or the inner diameter of each pipe. The thickness of the tubulars may be constrained to the nominal value and the inversion may solve for the eccentricity. In examples, processing the measurements taken by EM logging tool 100 may comprise comparing deflections in responses between short-spacing and long-spacing arrays to compute an eccentricity indicator. The eccentricity indicator may be used as a proxy for eccentricity. Indicators may allow for an operator to bends in tubulars.

In step 606, an operator may identify a zone with tubular bends based on the estimated eccentricity profile. For example, zones with tubular bends comprises identifying zones with eccentricity above a certain predefined threshold (e.g., eccentricity>10%, 20%, etc.) and zone length larger than another predefined minimum (e.g., 5 ft, 10 ft, etc.). In examples, identifying zones with tubular bends comprises computing the match between the estimated eccentricity profile and a database of patterns that correspond to a set of candidate tubulars bends, and picking zones where the match may be above certain predefined threshold (e.g., 50%, 75% or 90%).

The identified bends in 606 may be scaled in step 608. For example, step 608 comprises scaling the measured bend response to match the reference length in a database. The process of estimating the parameters of the bend comprises finding the bend pattern in a precomputed database that best fits the measured eccentricity profile. The process of finding the best fit in the database may comprise brute-force search, gradient-based inversion, or neural network training.

The identified zones, determined in step 606, may have parameters identified in step 610. Step 610 may comprise estimating the parameters of the identified bend. In examples, a precomputation of a library 612 (or database) of responses (patterns) for candidate pipe bends may be used in conjunction with step 610. For example, the database of patterns may be computed numerically through electromagnetic modeling of tubulars having bends with different parameters. The bend parameters include the index of the bended pipe (which pipe(s) is bended), the shape of the bend, the magnitude/severity of the bend, the axial extent of the bend. The database of patterns may be computed for a fixed axial length of the bends and the pattern matching process may be preceded by a scaling step to adjust the length of the bends in the database to match the real bend or vice versa (i.e., scaling the length of the real defect to match the reference length in the database). In examples, precomputed library 612 may be computed experimentally through measuring a set of pipes with different bend parameters. After parameters have been determined, a trajectory map may be produced.

In step 614 an operator may construct a pipe trajectory map. In examples, a trajectory map of a given pipe down to a given depth may be constructed through the integration of bends in that pipe incurred between wellhead 112 (e.g., referring to FIG. 1) and a given depth of measurement. The integration may be performed along the trajectory of EM logging tool 100 as measured by a navigation devices. With azimuthally symmetric pipe inspection tools may allow for the construction of a 2-dimensional maps of pipe trajectories.

In step 616, the pipe trajectory map may allow an operator to make wellbore decisions related to the integrity of the pipe string 138 or casing string 108. Using the pipe trajectory map, an analyst may spot locations with severe bends and monitor possible changes in pipe trajectories over time.

The preceding description provides various examples of the systems and methods for identifying deformations in a tubular disclosed herein which may contain different method steps and alternative combinations of components.

Statement 1. A method for identifying a deformation comprising: disposing an electromagnetic logging tool in a casing string, and wherein the electromagnetic logging tool comprises: a transmitter; and at least one receiver; performing a logging operation with the electromagnetic logging tool; transmitting an electromagnetic field from the transmitter; energizing the casing string with the electromagnetic field to produce an eddy current; measuring the eddy current with the at least one receiver; processing the measurement of the eddy current to find a point-wise eccentricity between the casing string and a pipe string; identifying a zone with the deformation based at least in part on the point-wise eccentricity; and determining at least one characteristic of the deformation.

Statement 2. The method of statement 1, wherein the electromagnetic logging tool is configured to acquire measurements either in a time-domain or a frequency-domain.

Statement 3. The method of statement 2, wherein the electromagnetic logging tool further comprises a navigation device and the navigation device is configured to measure an inclination angle and an azimuth of the electromagnetic logging tool.

Statement 4. The method of statements 1 or 2, wherein the processing the measurement comprises a model-based point-wise inversion to solve for one or more of the following: an individual thickness of the casing string, a percentage metal loss or a gain of the casing string, an individual magnetic permeability of the casing string, an individual electrical conductivity of the casing string, a total thickness of the casing string, an eccentricity of the casing string, or an inner diameter of the casing string.

Statement 5. The method of statement 4, wherein the individual thickness of the casing string is constrained to a nominal value and the model-based point-wise inversion solves for the point-wise eccentricity.

Statement 6. The method of statement 4, wherein the eccentricity of the casing string is constrained by an inclination the casing string measured by a navigation device.

Statement 7. The method of statements 1, 2, or 4, further comprising comparing a response from a short-spacing and a long-spacing to compute an eccentricity indicator, wherein a larger deflection on the short-spacing than the long-spacing indicate a higher eccentricity.

Statement 8. The method of statements 1, 2, 4, or 7, further comprising identifying the zone with an eccentricity above a predefined threshold.

Statement 9. The method of statements 1, 2, 4, 7, or 8, further comprising computing a match between an eccentricity profile and a database of patterns, wherein the database of patterns correspond to a set of deformations, and picking the zone where the match is above a predefined threshold.

Statement 10. The method of statement 9, wherein the database of patterns is computed numerically through an electromagnetic modeling of the casing string having the deformation with one or more bend parameters, wherein the one or more bend parameters include a shape of a bend, a magnitude of the bend, an axial extent of the bend, or an azimuth angle of the bend.

Statement 11. The method of statement 9, wherein the database of patterns is computed for a fixed axial length of the deformation or at a fixed azimuth angle.

Statement 12. The method of statement 9, wherein the database of patterns is computed experimentally through measuring a set of tubulars with different bend parameters.

Statement 13. The method of statement 9, further comprising matching the database of patterns with the at least one characteristic of the deformation that fits a measured eccentricity profile, wherein the matching includes a brute-force search, a gradient-based inversion, or a neural network training.

Statement 14. The method of statements 1, 2, 4, or 7-9, further comprising constructing a pipe trajectory map.

Statement 15. The method of statements 1, 2, 4, or 7-10, wherein the electromagnetic logging tool further comprises an azimuthal sensors configured to solve for an eccentricity angle, wherein the eccentricity angle at least in part constructs a three dimensional pipe trajectory map.

Statement 16. A system for identifying a deformation comprising: an electromagnetic logging tool comprising: a transmitter configured to transmit an electromagnetic field, wherein the electromagnetic filed energizes a casing string to produce and eddy current; and at least one receiver configured to measure the eddy current; and an information handling system configured to: identify a point-wise eccentricity between a casing string and a pipe string using measurements from the eddy current; identify a zone with the deformation based at least in part on the point-wise eccentricity; and identify at least one characteristic of the deformation.

Statement 17. The system of statement 16, wherein the information handling system solves for one or more of the following: an individual thickness of the casing string, a percentage metal loss or a gain of the casing string, an individual magnetic permeability of the casing string, an individual electrical conductivity of the casing string, a total thickness of the casing string, an eccentricity of the casing string, or an inner diameter of the casing string.

Statement 18. The system of statements 16 or 17, wherein the information handling system is further configured to compare a response from a short-spacing and a long-spacing to compute an eccentricity indicator, wherein a larger deflection on the short-spacing than the long-spacing indicate a higher eccentricity.

Statement 19. The system of statements 16-18, wherein the information handling system further configured to identify the zone with an eccentricity above a predefined threshold.

Statement 20. The system of statement 19, wherein the information handling system further configured to compute a match between an eccentricity profile and a database of patterns, wherein the database of patterns correspond to a set of deformations, and picking the zone where the match is above the predefined threshold.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying a deformation comprising:
    disposing an electromagnetic logging tool in a casing string, and wherein the electromagnetic logging tool comprises:
    a transmitter; and
    at least one receiver;
    performing a logging operation with the electromagnetic logging tool;
    transmitting an electromagnetic field from the transmitter;
    energizing the casing string with the electromagnetic field to produce an eddy current;
    measuring the eddy current with the at least one receiver;
    processing the measurement of the eddy current to find a point-wise eccentricity between the casing string and a pipe string;
    identifying a zone with the deformation based at least in part on the point-wise eccentricity; and
    determining at least one characteristic of the deformation.

2. The method of claim 1, wherein the electromagnetic logging tool is configured to acquire measurements either in a time-domain or a frequency-domain.

3. The method of claim 2, wherein the electromagnetic logging tool further comprises a navigation device and the navigation device is configured to measure an inclination angle and an azimuth of the electromagnetic logging tool.

4. The method of claim 1, wherein the processing the measurement comprises a model-based point-wise inversion to solve for one or more of the following: an individual thickness of the casing string, a percentage metal loss or a gain of the casing string, an individual magnetic permeability of the casing string, an individual electrical conductivity of the casing string, a total thickness of the casing string, an eccentricity of the casing string, or an inner diameter of the casing string.

5. The method of claim 4, wherein the individual thickness of the casing string is constrained to a nominal value and the model-based point-wise inversion solves for the point-wise eccentricity.

6. The method of claim 4, wherein the eccentricity of the casing string is constrained by an inclination of the casing string measured by a navigation device.

7. The method of claim 1, further comprising comparing a response from a short-spacing and a long-spacing to compute an eccentricity indicator, wherein a larger deflection on the short-spacing than the long-spacing indicate a higher eccentricity.

8. The method of claim 1, further comprising identifying the zone with an eccentricity above a predefined threshold.

9. The method of claim 1, further comprising computing a match between an eccentricity profile and a database of patterns, wherein the database of patterns correspond to a set of deformations, and picking the zone where the match is above a predefined threshold.

10. The method of claim 9, wherein the database of patterns is computed numerically through an electromagnetic modeling of the casing string having the deformation with one or more bend parameters, wherein the one or more bend parameters include a shape of a bend, a magnitude of the bend, an axial extent of the bend, or an azimuth angle of the bend.

11. The method of claim 9, wherein the database of patterns is computed for a fixed axial length of the deformation or at a fixed azimuth angle.

12. The method of claim 9, wherein the database of patterns is computed experimentally through measuring a set of tubulars with different bend parameters.

13. The method of claim 9, further comprising matching the database of patterns with the at least one characteristic of the deformation that fits a measured eccentricity profile, wherein the matching includes a brute-force search, a gradient-based inversion, or a neural network training.

14. The method of claim 1, further comprising constructing a pipe trajectory map.

15. The method of claim 1, wherein the electromagnetic logging tool further comprises an azimuthal sensors configured to solve for an eccentricity angle, wherein the eccentricity angle at least in part constructs a three dimensional pipe trajectory map.

16. A system for identifying a deformation comprising:
an electromagnetic logging tool comprising:
   a transmitter configured to transmit an electromagnetic field, wherein the electromagnetic field energizes a casing string to produce and eddy current; and
   at least one receiver configured to measure the eddy current; and
an information handling system configured to:
   identify a point-wise eccentricity between a casing string and a pipe string using measurements from the eddy current;
   identify a zone with the deformation based at least in part on the point-wise eccentricity; and
   identify at least one characteristic of the deformation.

17. The system of claim 16, wherein the information handling system solves for one or more of the following: an individual thickness of the casing string, a percentage metal loss or a gain of the casing string, an individual magnetic permeability of the casing string, an individual electrical conductivity of the casing string, a total thickness of the casing string, an eccentricity of the casing string, or an inner diameter of the casing string.

18. The system of claim 16, wherein the information handling system is further configured to compare a response from a short-spacing and a long-spacing to compute an eccentricity indicator, wherein a larger deflection on the short-spacing than the long-spacing indicate a higher eccentricity.

19. The system of claim 16, wherein the information handling system further configured to identify the zone with an eccentricity above a predefined threshold.

20. The system of claim 19, wherein the information handling system further configured to compute a match between an eccentricity profile and a database of patterns, wherein the database of patterns correspond to a set of deformations, and picking the zone where the match is above the predefined threshold.

\* \* \* \* \*